United States Patent [19]

Busboom

[11] Patent Number: 4,958,484

[45] Date of Patent: Sep. 25, 1990

[54] VEGETATION CUTTING BLADES ASSEMBLY

[75] Inventor: Garry W. Busboom, Beatrice, Nebr.

[73] Assignee: Exmark Manufacturing Company Incorporated, Beatrice, Nebr.

[21] Appl. No.: 386,155

[22] Filed: Jul. 28, 1989

[51] Int. Cl.$^5$ ............................................ A01D 34/68
[52] U.S. Cl. ......................................... 56/255; 56/6; 56/13.5
[58] Field of Search .................. 56/6, 13.5, 13.6, 13.7, 56/16.9, 17.5, 255, 294, 295, 320.2, DIG. 6, DIG. 17, DIG. 20; 30/347

[56] References Cited

U.S. PATENT DOCUMENTS

| | | | |
|---|---|---|---|
| 3,152,431 | 10/1964 | Ott et al. | 56/295 |
| 3,452,530 | 7/1969 | Kulak | 56/6 |
| 3,916,606 | 11/1975 | Brudnak, Jr. et al. | 56/6 |
| 4,226,074 | 10/1980 | Mullet et al. | 56/6 |

*Primary Examiner*—Ramon S. Britts
*Assistant Examiner*—Terry Lee Melius
*Attorney, Agent, or Firm*—George R. Nimmer

[57] ABSTRACT

Vegetation cutting apparatus having a frontal housing deck overlies at least three rotary blade cutters arrayed leftwardly, medially, and rightwardly for simultaneously cutting a continuous transversely extending swath and centifugally discharging the cuttings through a central and rearwardly longitudinally extending cuttings chute. The vertical shaft for each horizontal rotary blade carries a sheave; a belt transmission means, emanating from a powered gearbox, drives the respective blade sheaves and also a reversing sheave, the latter ensuring that the arrayed rotary blades direct vegetation cuttings toward the central discharge chute. A novel spring-loaded device maintains constant tension upon the circuitous belt transmission means.

3 Claims, 3 Drawing Sheets

VEGETATION CUTTING BLADES ASSEMBLY

BACKGROUND AND OBJECTIVE OF THE INVENTION

Toward the objective of cutting wide swaths of grass or other growing vegetation, overland traversible apparatus utilizes a plurality of side-by-side rotary blades adapted for simultaneously cutting vegetation and centrifugally discharging the cuttings through one or more tubular chutes. For grass cutting operations wherein it is desired to have the discharge chute extend centrally along the cutting apparatus traversal path, prior art workers (e.g. as in U.S. Pat. No. 3,452,530) have positioned the side-by side rotary blades in overlapping and necessarily meticulously synchronized rotary relationship. In the latter regard, each rotary blade is actuatably connected to a gearbox sheave and the respective gearbox sheaves are inter-connectably synchronized to prevent the overlapping rotary blades from colliding during the vegetation cutting operation. However, such gearbox synchronization means are deficient in that gearboxes and their inter-connected couplings are expensive and excessively noisy and in that the couplings have a tendency to malfunction which can result in severe collision damage to the rotary blades and to the gearbox parts. It is accordingly the general objective of the present invention to provide a housed vegetation cutting blades assembly that overcomes the disadvantages and deficiencies associated with prior art rotary blade assemblies.

BRIEF DESCRIPTION OF THE DRAWING

In the drawing, wherein like characters refer to like parts in the several views, and in which.

DETAILED DESCRIPTION OF THE DRAWING

Figure 1:
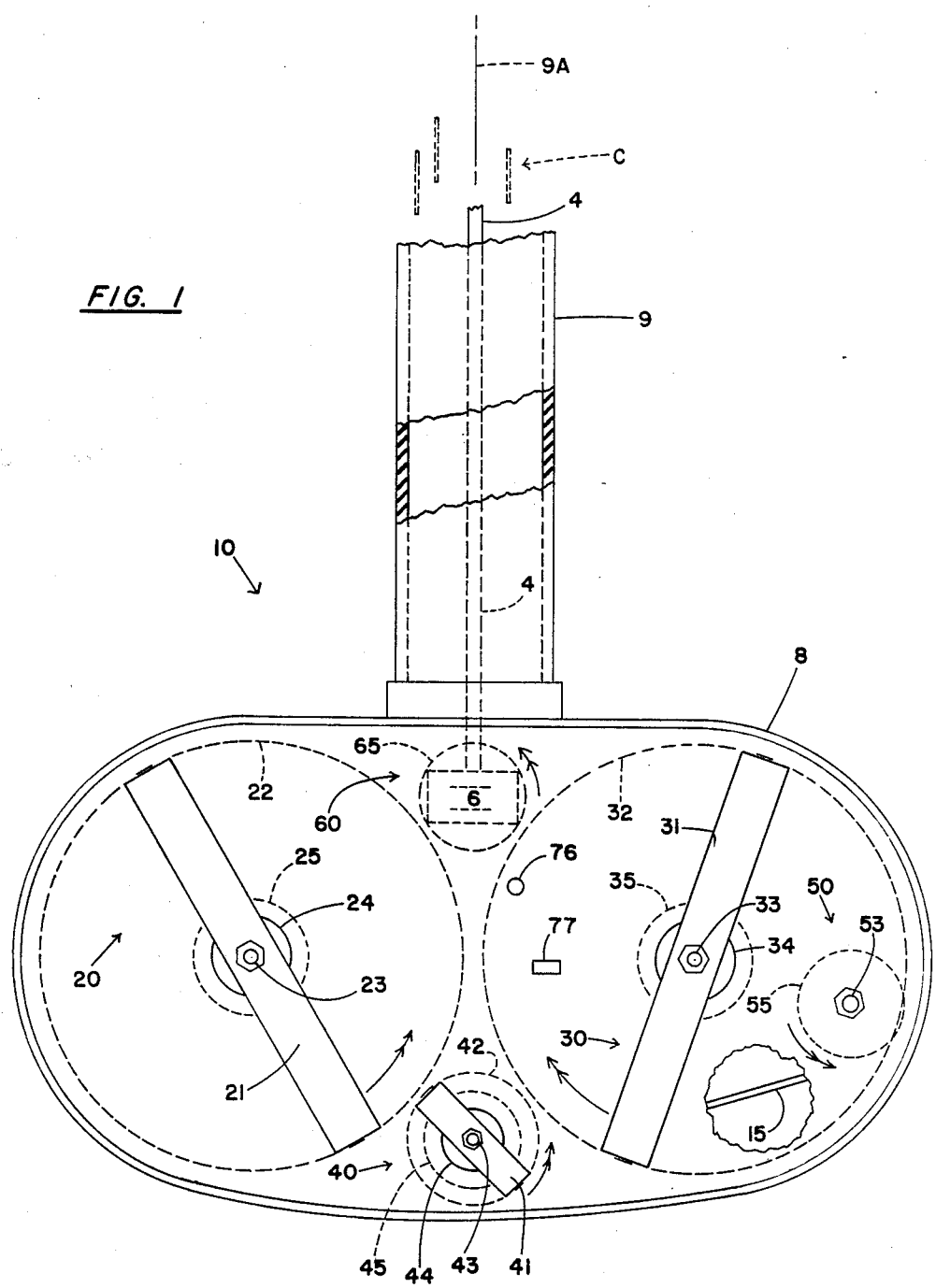
FIG. 1 is a bottom plan view, partly in section, of a representative embodiment (10) of the vegetation cutting blades assembly of the present invention and taken along line 1—1 of FIG. 2.

In the drawing, reference characters 4–9, 21, 31, "G" "V", and "C", are adopted from U.S. Pat. No. 3,452,530 and analogous prior art wherein 8 refers to a blades housing frontal portion for vegetation cutting apparatus traveling directionally longitudinally (9A) along a terrain ("G") of growing vegetation ("V"). 9 refers to a cuttings chute medially communicating with dome-like housing deck 8 and extending horizontally along longitudinal central-axis 9A, whereby vegetation cuttings ("C") might be rearwardly conveyed e.g. toward a suitable receptacle. 6 refers to a gearbox centrally and rearwardly mounted atop housing deck 8 and driveable (via universal joint means 5) with a longitudinally extending drive-shaft (4) for the vegetation cutting apparatus. 21 and 31 refer to side-by-side horizontal rotary blades for cutting a transversely extending swath of growing vegetation ("V") as the apparatus travels longitudinally (9A); however, as will be explained, actual employment herein of the side-by-side rotary blades (21, 31) differs markedly from the prior art.

As is readily apparent from FIG. 1, the vegetation cutting blades assembly herein (e.g. 10), and along the transversely extending width of a conventional and rearwardly chuted housing deck (8), comprises at least three horizontal rotary cutter blades (21, 31, 41) circumscribing three non-intersecting circles (22, 32, 42) whereby they collectively cut a continuously transversely extending swath of growing vegetation ("V"). Moreover, as indicated by the doubleheaded curved arrows in FIG. 1, the larger diameter and substantially transversely aligned rotary blades 21 and 31 rotate in opposite angular directions and respectively toward the horizontally rearwardly extending central chute (9) whereby vegetation cuttings ("C") are centrifuged thereinto for rearward conveyance therealong. FIG. 1 also generally alludes to an endless belt type transmission means 15 emanating from a sheave (65) of driven gearbox 6 and which belt is trained about rotary sheaves (25, 35, 45) to simultaneously rotate the three cutting blades (21, 31, 41) and, by virtue of a reversing sheave (55), including said opposite angular rotation of blades 21 and 31.

Figure 2:
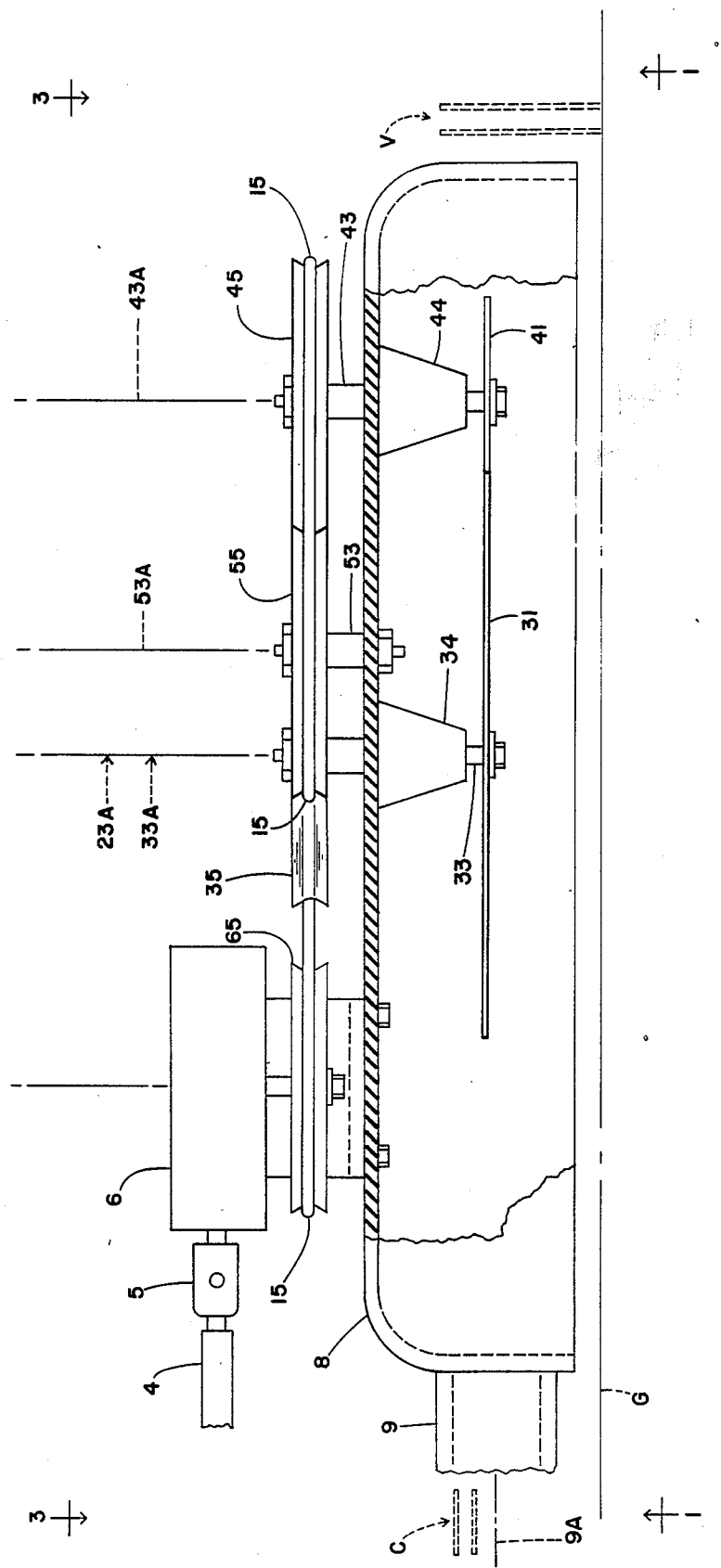
FIG. 2 is a leftward side elevational view, partly in section, of the FIG. 1 representative embodiment.
Figure 3:
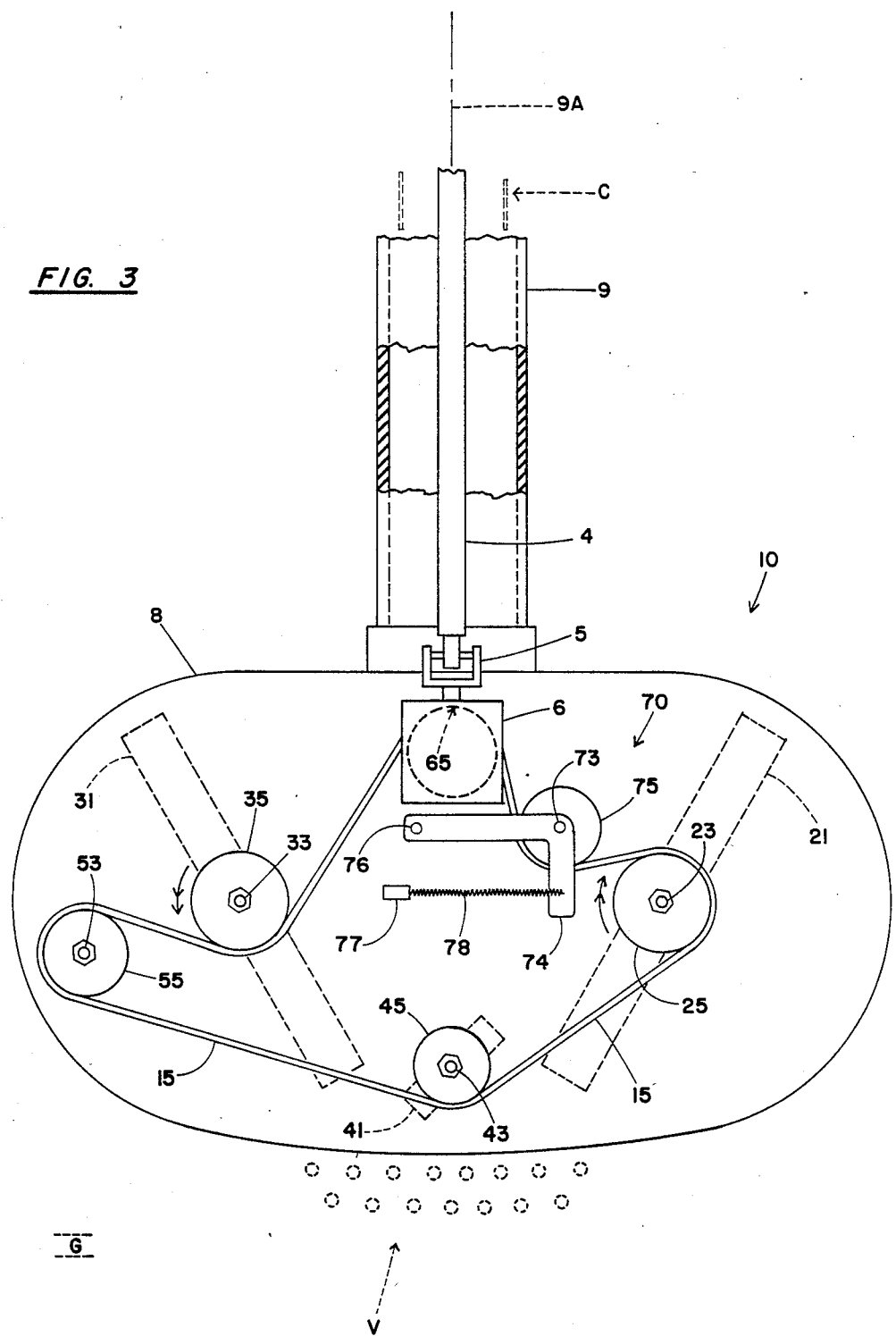
FIG. 3 is a top plan view of the vegetation cutting blades assembly and taken along line 3—3 of FIG. 2.

Referring now also to drawing FIGS. 2 and 3, it can be seen that there are five sheave stations including at: rightward blade station 20; leftward blade station 30; medial blade station 40; belt reversing station 50; and gearbox station 60.

Rightward blade station 20 includes a rightward vertical shaft 23 rotatably secured to a rightward position (23A) of housing deck 8. Above deck 8, shaft 23 carries rightward sheave 25. Bearing housing 24 extends downwardly from deck 8 and surrounds shaft 23; rotary cutting blade 21 is centrally attached to rightward vertical shaft 23. As rightward shaft 23 rotates, the periphery of rotary blade 21 circumscribes a rightward circle 22 surrounding rightward-axis 23A that is located predominately (and preferably wholly) rightwardly of central-axis 9.

Leftward blade station 30 includes a leftward vertical shaft 33 rotatably secured to a leftward portion of housing deck 8 and substantially transversely aligned with rightward shaft 23. Above deck 8, shaft 33 carries a leftward sheave 32. A bearing-housing 34 extends downwardly from deck 8 and surrounds shaft 33; rotary cutting blade 31 is centrally attached to leftward vertical shaft 33. As leftward shaft 33 rotates, the periphery of rotary blade 31 circumscribes a leftward circle 32 surrounding leftward-axis 33A and located predominately (and preferably wholly) leftwardly of central-axis 9A whereby a finite gap exists between circular loci 22 and 32. The circular loci 22 and 32 for blades 21 and 31 are preferably of substantially equal diameters.

Medial blade station 40 includes a medial vertical shaft 43 rotatably secured to a central forward portion of housing deck 8. Above deck 8, shaft 43 carries a medial sheave 45. A bearing-housing 44 extends downwardly from deck 8 and surrounds shaft 43. A rotary cutting blade 41, preferably having a length less than one-half that of blades 21 or 31, is centrally attached to medial vertical shaft 43. As medial shaft 43 rotates, the periphery of rotary blade 41 circumscribes a medial circle 42 surrounding medial-axis 43A located at central-axis 9A and being disposed mainly forwardly of and non-intersecting with circular loci 22 and 32. As previously alluded to, an endless belt transmission means (15), emanating from a sheave (65) of a powerably driven gearbox (4–6) and trained with the rotary blade sheaves (25, 35, 45), causes simultaneous rotation of the said arrayed cutting blades (21, 31, 41). Thus, the aforedescribed positioning of rotating blades loci 22, 32, and 42, ensures the cutting of a continuously transversely extending swath of growing vegetation ("V").

Reversing station 50 includes a vertical shaft 53 rotatably secured to a housing deck location (e.g. 53A) that, in comparison to the blade shaft locations (23A, 33A, 43A), is the most transversely remote from deck longitudinal central-axis 9A. Above deck 8, reversing shaft 53 carries a reversing sheave 55 having said endless belt 15 trained thereon and with the purpose that the two substantially transversely aligned rotary blades (21, 31) rotate in opposite angular directions and respectively toward cuttings chute 9. For example, reversing shaft 53 might be located leftwardly and forwardly of leftward vertical shaft 33 whereby, for the appropriate angular directions indicated by the double-headed curved arrows, belt transmission 15 is trained in the following order:

(a) from gearbox sheave 65 to rightward sheave 25;
(b) from rightward sheave 25 to medial sheave 45;
(c) from medial sheave 45 to reversing sheave 55;
(d) from reversing sheave 55 to leftward sheave 35; and
(e) from leftward sheave 35 to gearbox sheave 65.

There are tensioning means (70) inherently adapted to maintain tension upon the endless belt transmission means (15). Herein, such belt tensioning means comprises an L-shaped member having one leg pivotably connected (76) to housing deck 8 and having the other leg connected by a helical spring (78) to an upstanding deck peg (77). A tension sheave 75, which is rotatably secured to a central portion of the L-shaped member, is accordingly adapted to apply constant spring-biased pressure (78) upon belt 15.

From the foregoing, the construction and operation of the vegetation cutting blades assembly will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed is as follows:

1. In combination with vegetation cutting apparatus of the type comprising a directionally longitudinally extending drive-shaft frontally actuatably connected to a gearbox mounted to a directionally transversely extending housing deck for a plurality of horizontal rotary cutting blades and further comprising a vegetation cuttings chute communicating with a medial portion of and extending horizontally rearwardly from said housing deck along a directionally longitudinal central-axis, a housed cutting blades assembly rotatably actuated from said gearbox and arrayed to cut a continuously directionally transversely extending swath of growing vegetation, said improvement comprising:

(A) a rightward cutter blade centrally attached to a vertical rightward shaft rotatably secured to a rightwardly transversely offset portion of said housing deck and carrying a rightward sheave, the periphery of said rightward cutter blade circumscribing a rightward circle located predominately transversely rightwardly of said longitudinal central-axis;

(B) a leftward cutter blade centrally attached to a vertical leftward shaft rotatably secured to a leftwardly transversely offset portion of said housing deck and transversely aligned with said rightward shaft, said leftward shaft carrying a leftward sheave, the periphery of said leftward cutter blade circumscribing a leftward circle located predominately transversely leftwardly of said longitudinal central-axis and in adjacent non-intersecting relationship with said rightward circle, the diameter of said leftward circle being substantially equal to that for said rightward circle;

(C) a medial cutter blade centrally attached to a vertical medial shaft rotatably secured to a central forward portion of said housing deck and carrying a medial sheave, the periphery of said medial cutter blade circumscribing a medial circle located at said longitudinal central-axis and being disposed mainly forwardly of and in adjacent non-intersecting relationship with said rightward and leftward circles, the diameter for said medial circle not exceeding one-half that of said rightward circle;

(D) a reversing sheave that is located forwardly from and transversely offset from said transversely aligned rightward and leftward shafts; and (E) endless belt type transmission means emanatating from a gearbox sheave and trained with each of said sheaves, and so as to rotate the rightward and leftward cutter blades in opposite angular directions and respectively angularly toward said longitudinally horizontally rearwardly extending cuttings chute.

2. The vegetation cutting blades assembly of claim 1 wherein there are tension means adapted to maintain tension upon said endless belt type transmission means.

3. The vegetation cutting blades assembly of claim 1 wherein an endless belt type transmission means is trained in the following order: from the gearbox sheave to said rightward sheave; from said rightward sheave to said medial sheave; from said medial sheave to said reversing sheave located forwardly and leftwardly of said leftward shaft; from said reversing sheave to said leftward sheave; and from said leftward sheave to said gearbox sheave.

* * * * *